(12) United States Patent
VanDenberg et al.

(10) Patent No.: US 7,398,959 B2
(45) Date of Patent: Jul. 15, 2008

(54) APPARATUS FOR SUPPORTING THE TRAILER OF A TRACTOR-SEMITRAILER

(75) Inventors: Ervin VanDenberg, Massillon, OH (US); Jose Manuel Alguera Gallego, Aschaffenburg (DE); Gerald Muller, Oberishausen (DE); Steffen Pfister, Langen (DE)

(73) Assignee: Jost-Werke GmbH & Co. KG, Frankfurt (DE)

( * ) Notice: Subject to any disclaimer, the term of this patent is extended or adjusted under 35 U.S.C. 154(b) by 392 days.

(21) Appl. No.: 10/371,569

(22) Filed: Feb. 21, 2003

(65) Prior Publication Data

US 2003/0168648 A1    Sep. 11, 2003

Related U.S. Application Data

(63) Continuation of application No. 09/762,787, filed as application No. PCT/EP99/05733 on Aug. 7, 1999, now abandoned.

(30) Foreign Application Priority Data

Aug. 13, 1998   (DE) .................. 198 36 635

(51) Int. Cl.
    *B60S 9/04*   (2006.01)
(52) U.S. Cl. .................. 254/419; 254/421; 254/2 R
(58) Field of Classification Search ................ 254/419, 254/421–425, 2 R
    See application file for complete search history.

(56) References Cited

U.S. PATENT DOCUMENTS

| 252 A | 6/1837 | Nelson et al. |
|---|---|---|
| 1,686,989 A | 10/1928 | Ridley |
| 2,232,187 A | 2/1941 | Reid |
| 2,550,801 A * | 5/1951 | Geerds ............... 192/223.3 |
| 2,747,422 A | 5/1956 | Walther |
| 2,815,962 A | 12/1957 | McKay |
| 2,885,220 A | 5/1959 | Dalton |
| 2,977,094 A | 3/1961 | McKay |
| 3,010,699 A | 11/1961 | McKay |
| 3,033,522 A | 5/1962 | McKay |
| 3,136,527 A | 6/1964 | Griffis |
| 3,151,707 A * | 10/1964 | Dalton ............... 188/135 |
| 3,201,086 A | 8/1965 | Dalton |
| 3,236,501 A | 2/1966 | McKay |
| 3,240,300 A | 3/1966 | McKay |
| 3,259,364 A | 7/1966 | Hulverson et al. |
| 3,436,987 A | 4/1969 | Baxter |
| 3,518,890 A | 7/1970 | Eastman |
| 3,596,877 A | 8/1971 | Eastman |

(Continued)

FOREIGN PATENT DOCUMENTS

DE    42 21 958 C1    11/1993

(Continued)

*Primary Examiner*—Lee D Wilson
(74) *Attorney, Agent, or Firm*—Sand & Sebolt

(57) ABSTRACT

An apparatus for supporting a trailer of a tractor semitrailer has a supporting element that is telescopically adjustable by way of a gear shifting mechanism having a gear input shaft running vertically onto a spindle. In this way, the supporting element has an especially compact construction and can be installed very easily. The gear shift also has a free floating gear between two shift positions and can be shifted very conveniently.

32 Claims, 10 Drawing Sheets

U.S. PATENT DOCUMENTS

| | | | |
|---|---|---|---|
| 3,632,086 A | 1/1972 | Mai | |
| 3,675,497 A | 7/1972 | Thomas | |
| 3,726,543 A | 4/1973 | Dalton | |
| 3,807,756 A | 4/1974 | Glassmeyer | |
| 3,861,648 A | 1/1975 | Glassmeyer | |
| 3,892,141 A | 7/1975 | Phillips, Jr. et al. | |
| 3,976,310 A | 8/1976 | Carr | |
| 4,004,830 A | 1/1977 | Belke | |
| 4,124,225 A | 11/1978 | Lozada et al. | |
| 4,187,733 A | 2/1980 | Walther et al. | |
| 4,205,824 A | 6/1980 | Mai | |
| 4,270,783 A | 6/1981 | Sorensen et al. | |
| 4,281,852 A | 8/1981 | Konkle | |
| 4,466,637 A | 8/1984 | Nelson | |
| 4,482,039 A | 11/1984 | Harris | |
| 4,634,144 A | 1/1987 | Ringe | |
| 4,824,136 A | 4/1989 | Bobby | |
| 4,863,184 A | 9/1989 | Mena | |
| 4,871,188 A | 10/1989 | Baxter | |
| 4,875,821 A | 10/1989 | Oren | |
| 4,889,357 A | 12/1989 | Perry | |
| 4,903,977 A | 2/1990 | Baxter | |
| 4,905,953 A | 3/1990 | Wilson | |
| 4,919,234 A | 4/1990 | Pearson, deceased et al. | |
| 4,921,269 A | 5/1990 | Scully | |
| 4,923,175 A | 5/1990 | Bentrup | |
| 4,955,450 A | 9/1990 | Deinlein-Kalb et al. | |
| 5,199,738 A | 4/1993 | VanDenberg | |
| 5,238,266 A | 8/1993 | VanDenberg | |
| 5,409,251 A | 4/1995 | Thorndyke | |
| 5,435,523 A | 7/1995 | Hying et al. | |
| 5,451,080 A | 9/1995 | Kneile | |
| 5,538,225 A | 7/1996 | VanDenberg | |
| 5,676,018 A | 10/1997 | VanDenberg | |
| 5,730,455 A | 3/1998 | Varnum, Sr. et al. | |
| 5,911,437 A | 6/1999 | Lawrence | |
| 6,099,016 A | 8/2000 | Peveler | |
| 6,141,997 A | 11/2000 | Blehi, III | |

FOREIGN PATENT DOCUMENTS

| | | |
|---|---|---|
| DE | 196 16 704 A1 | 10/1997 |
| EP | 0 675 029 A1 | 10/1995 |
| EP | 1 350 701 A2 | 10/2003 |
| GB | 122401 | 8/1919 |

* cited by examiner

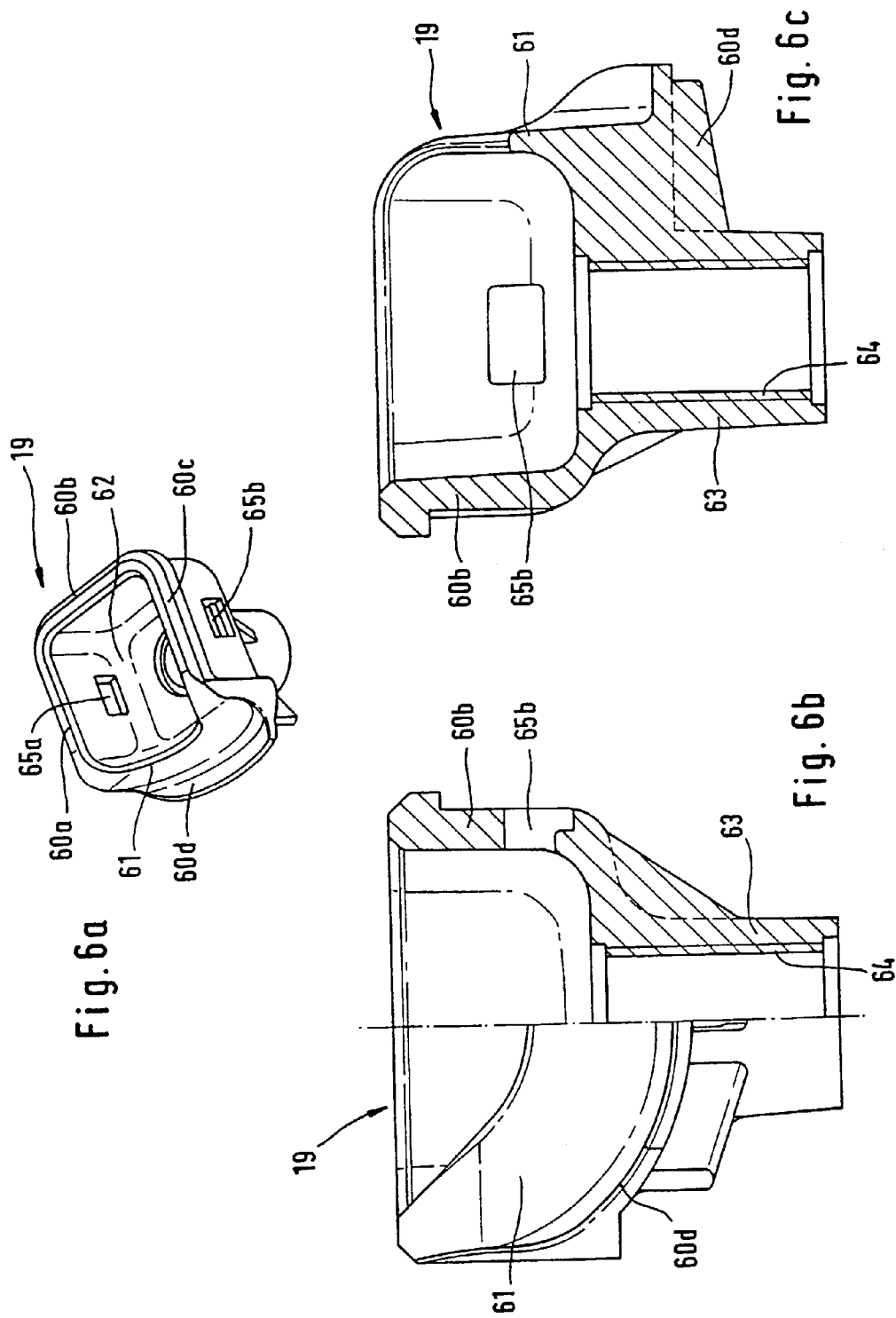

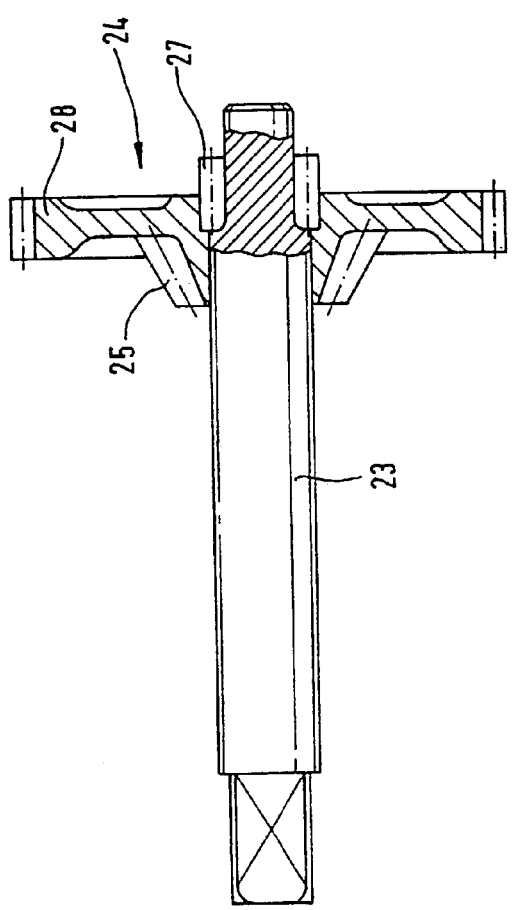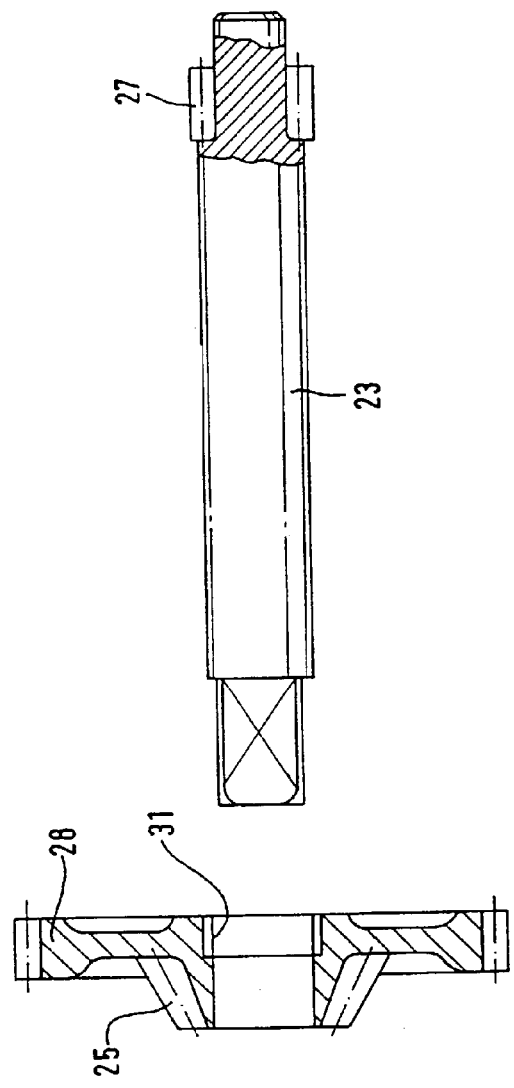
Fig. 9b

APPARATUS FOR SUPPORTING THE TRAILER OF A TRACTOR-SEMITRAILER

CROSS REFERENCE TO RELATED APPLICATIONS

The present application is continuation of application Ser. No. 09/762,787 which is a National Phase application under section 371 of PCT/EP99/05733 filed Aug. 7, 1999; the disclosures of which are incorporated herein by reference.

BACKGROUND OF THE INVENTION

1. Technical Field

The present invention generally relates to trailer landing gear and apparatus for supporting the trailer of a semitrailer.

2. Background Information

The invention concerns an apparatus for supporting a trailer of a tractor-semitrailer with a supporting element of adjustable height in a telescoping manner and having an outer sleeve and an inner sleeve, with a spindle mounted in the supporting element and driven by a multi-position gear shifting mechanism via a bevel gear/sprocket wheel arrangement, and with a spindle nut engaging one of the sleeves and collaborating with a spindle, said gear shifting mechanism displaying a pinion and an input gear shaft having a large-diameter sprocket wheel, a set of sprockets rotatably mounted and collaborating with the sprockets of the gear input shaft and bevel gear arrangement as well as shiftable clutching/coupling means which are designed for the optional connection of the gear input shaft with the sprocket wheels of the sprocket wheel set via one of the sprocket wheels.

Such an apparatus is known, for example, from EP-0675029. In this case the gear shift is situated in a housing attached to the outer sleeve. The housing and the wall of the outer sleeve lying opposite the housing in each case have a support for the gear input shaft and gear output shaft on which the set of sprocket wheels is arranged nonrotatably. The gear input shaft in this case is arranged below and the gear output shaft above the bevel gear arrangement. The gear input shaft can be rotated by a hand crank and is guided eccentrically past the spindle. The gear output shaft is guided through the housing of the gear shifting mechanism so that at this place two identical supporting elements may be connected to one shaft and may be adjusted uniformly in height. The translation generated with the large-diameter sprocket wheel of the gear input shaft in connection with a small-diameter sprocket wheel of the sprocket wheel set serves for fast adjustment, while the translation generated by the pinion of the gear input shaft and a large-diameter sprocket wheel of the sprocket wheel set is provided for adjusting the height of the supporting element under a load.

From DE 196 16 704 A1 a drive mechanism for a manually operated lifting device, especially a trailer rest support is known in which the gears are installed in a gearbox and the drive mechanism in a drive/transmission housing outside of the trailer support. In this way no special assembly devices are required and the required installation space is not enlarged.

The disadvantage of the known apparatus is the fact that the large-diameter sprocket wheel of the gear input shaft may protrude to the side past the outer sleeve or must have a very small diameter as a result of the arrangement of the gear input shaft beside the spindle. For a translation ratio intended for the fastest possible adjustment this necessitates designing the housing for the gear shift mechanism to be strongly projecting and costly.

The invention has the objective of designing an apparatus of the type mentioned initially in such a way that it is constructed as compactly as possible.

SUMMARY OF THE INVENTION

This problem is solved according to the invention by an arrangement of the gear input shaft running onto the spindle vertically and in one plane.

By this configuration the gear input shaft no longer need be guided past the spindle. The large-diameter sprocket wheel of the gear input shaft can therefore be made as large as the largest sprocket wheel of the set of sprocket wheels or of the bevel gear arrangement without at the same time protruding out of the sleeve of the supporting element. The supporting element of the device according to the invention is therefore of especially compact configuration. Furthermore, thanks to the invention the gear with the gear input shaft can be installed from one side of the supporting element at relatively low cost.

The structure of the apparatus according to the invention is further simplified if the spindle and the gear input shaft have a common bearing block. This configuration also leads to a reduction in the number of components of the supporting element.

The gear shift according to another advantageous variant of the invention has especially few components if the set of sprocket wheels and the gear output shaft are fashioned as one part. This makes the assembly of the supporting element especially simple.

The supporting element according to another advantageous variant of the invention is especially simple in design if a small-diameter sprocket of the sprocket set is designed as an interlocking connection of the gear output shaft with an inner denticulation of the remaining sprocket wheels of the sprocket wheel set. As a result no additional means for affixing the sprocket wheel set to the gear output shaft are required.

The gear shift can be assembled, according to another advantageous variant of the invention, with a small number of standardized components for different graduations if a large-diameter sprocket wheel of the sprocket wheel set has internal denticulation and is fitted over a correspondingly configured external denticulation of a bevel gearwheel of the bevel gear wheel arrangement.

For example, in the case of a pipe-like design of the gear input shaft the clutching means could be designed as a moveable spring coupling key for generating an interlocking connection between the sprocket wheels and the gear input shaft. However, the number of components of the gear shift can be reduced according to another advantageous variant of the invention if the pinion of the gear input shaft is designed as a means for coupling the gear input shaft to the large-diameter sprocket wheel having internal denticulation. The envisioned shift position of the gear shift mechanism can be selected in this case by moving the pinion of the gear input shaft into a position engaging the internal denticulation of the large-diameter sprocket wheel of the gear input shaft or into a position combing with the large-diameter sprocket wheel of the sprocket wheel set.

The gear shift according to another advantageous variant of the invention has a neutral/free-floating gear in which no transmission of torques from the gear input shaft or the gear output shaft takes place if the large-diameter sprocket wheel of the gear input shaft has a cup-shaped region provided to accept/hold the pinion in a central position. In this way the adjustment of two supporting elements connected to each other on the gear output shaft is substantially facilitated since in this case the gear shift of the not-driven supporting element need not be moved along with it. Furthermore by this configuration the shifting of the gear shift mechanism is facilitated.

The large-diameter sprocket wheel of the gear input shaft according to another advantageous variant of the invention, can be mounted simply on the outside of a cup-shaped region if the pinion of the gear input shaft is arranged closer to the spindle than the large-diameter sprocket wheel. This contributes to further simplification of the structure of the gear shift mechanism.

The gear shift mechanism can be shifted, for example, by pushing/moving the pinion on the gear input shaft. However, this requires a high manufacturing cost for a non-rotatable and axially displaceable holder for the pinion. The gear shift mechanism, however, has an especially low manufacturing cost if the gear input shaft and the pinion are made as one piece. To shift the gear shift then the gear input shaft can be moved. This can be achieved from the outside of the supporting element without additional construction costs.

The supporting element according to another advantageous variant of the invention can be manufactured especially economically if the gear input shaft and the gear output shaft are mounted in a cover which closes an opening of the outer sleeve.

The production costs for the supporting element are further reduced according to another advantageous variant of the invention if the cover is designed as one part.

The movably configured gear input shaft could, as in the case of the known device, have a boring in which locking elements are arranged which engage the grooves of the gear housing. A costly boring in the gear input shaft can be avoided simply if the gear input shaft has at least one groove to accept/hold locking elements clamped in radially toward the inside in cartridges of the cover or the bearing block.

The cover may be manufactured economically from plastic, for example. However, according to another advantageous variant of the invention the cover will have especially high stability if it is manufactured from a sintered material.

The gear shifting mechanism, according to another advantageous variant, can be mounted completely in the outer sleeve of the supporting element if the spindle is arranged outside of the center of the supporting element. Thanks to the invention the sprocket wheels of the gear shifting mechanism are completely protected against damage by the necessarily very stable outer sleeve so that the cover for the gear can be made especially small and light. This configuration also contributes to an especially compact structure of the supporting element. The supporting element, according to another advantageous variant of the invention, can be provided with an electric motor. The electric motor is preferably provided for operating under load. The output shaft of the electric motor is preferably identical with the gear input shaft.

The spindle nut preferably has a cup-shaped interior space which is bounded by three collar segments situated at the same height. The bearing block engages the cup-shaped interior space when the spindle nut is driven upward. As a result the spindle nut can be moved farther upward than was previously possible. In the region of the large-diameter sprocket wheel the spindle nut has a lower-lying collar segment. As a result the large-diameter sprocket wheel of the gear shifting mechanism may extend at least partially into the region of the spindle nut, thus improving the compact arrangement further.

In order to provide the top side of the spindle nut with a lubricant reservoir for the spindle the spindle nut, preferably above the lower lying collar segment, has an intermediate wall extending upward.

The bearing block advantageously has a depression into which the bevel gearwheel located on the spindle extends at least partially. Besides the compact arrangement in this way a weight reduction is achieved.

The threaded input shaft is supported in the bearing block by a bearing boring which preferably extends as far as the through-going boring for the spindle.

The bearing block is preferably connected, especially welded, to the outer sleeve on only three sides, the fourth side being spaced some distance away, toward the outer sleeve. As a result between the bearing block and the outer sleeve a free space is created which can be utilized for the large-diameter sprocket wheel of the sprocket wheel set. This makes it possible to position this large-diameter sprocket wheel completely on the inside. The spindle nut is matched to it by the lower-lying collar segment.

Below the large-diameter sprocket wheel preferably a collecting trough for lubricant is arranged. On the whole an arrangement is created in which the gear input shaft is arranged below the gear output shaft and the spindle and shaft lie in the same plane. The gear output shaft in this case stands perpendicular on the spindle axis.

To enlarge the interior space in the region of the gear shifting mechanism the outer sleeve preferably has local embossings. These local embossings are located in the round segments of the outer sleeve.

All components are optimized with respect to a compact arrangement so that the entire gear is arranged inside the outer sleeve. Another advantage is the fact that the translation ratio of the gear could be clearly increased compared to conventional supporting elements for the same sleeve diameter.

BRIEF DESCRIPTION OF THE DRAWINGS

The invention permits numerous variants. For further illustration of its basic principle, one of them is shown in the drawing and described in the following. It shows in FIG. 1. A side view of a trailer supported on an apparatus according to the invention, FIG. 2. An enlarged view from the front of the trailer in FIG. 1, FIG. 3. A longitudinal segment through the upper region of the supporting element of the apparatus according to the invention in FIG. 1, FIG. 4. The Supporting element in FIG. 3 in a second shift position, FIG. 5. Another variant of the supporting element with electric motor, FIG. 6*a*. A perspective view of the spindle nut, FIG. 6*b,c*. Vertical section through the spindle nut in FIG. 6*a*, FIG. 7*a,b*. Vertical section and a top view of a bearing block, FIG. 8. A perspective view of the outer pipe, FIG. 9*a-c*. Detailed representations of the bevel gearwheel arrangement.

DETAILED DESCRIPTION OF THE PREFERRED EMBODIMENTS

Figure 1:
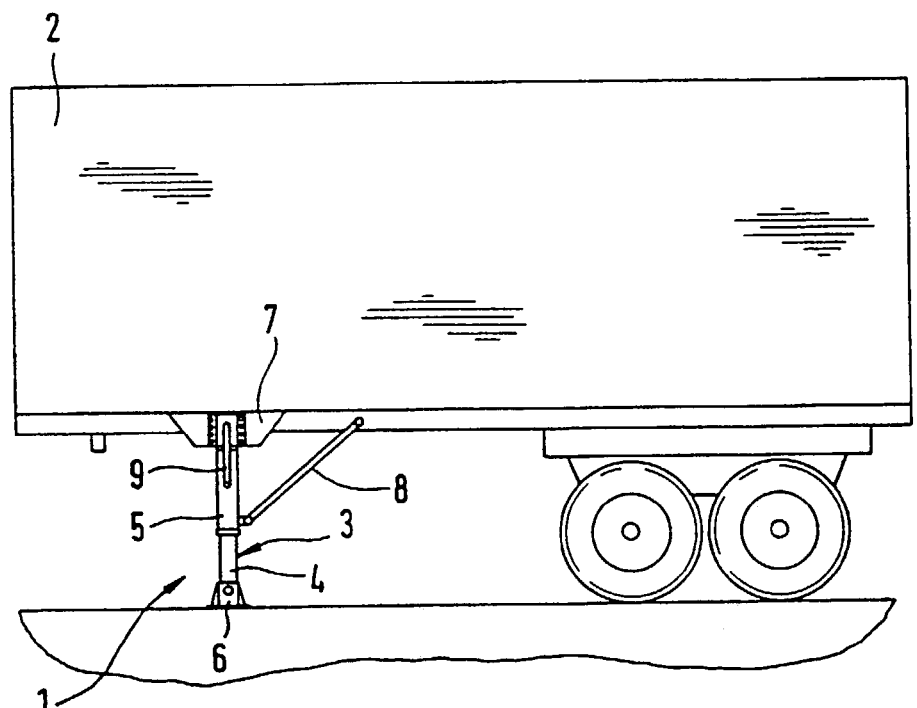

FIG. 1 shows a trailer 2 of a tractor-semitrailer supported by an apparatus 1 according to the invention. The apparatus 1 has a supporting element 3 with telescoping height adjustment, with an inner sleeve 4 and an outer sleeve 5. The inner sleeve 4 is supported on the ground by a foot 6. The outer sleeve 5 is affixed to a plate 7 on the trailer 2. To increase the tipping safety a cross strut 8 is arranged between the outer sleeve 5 and the trailer 2. The supporting element 3 has a hand crank 9 in its upper region.

Figure 2:
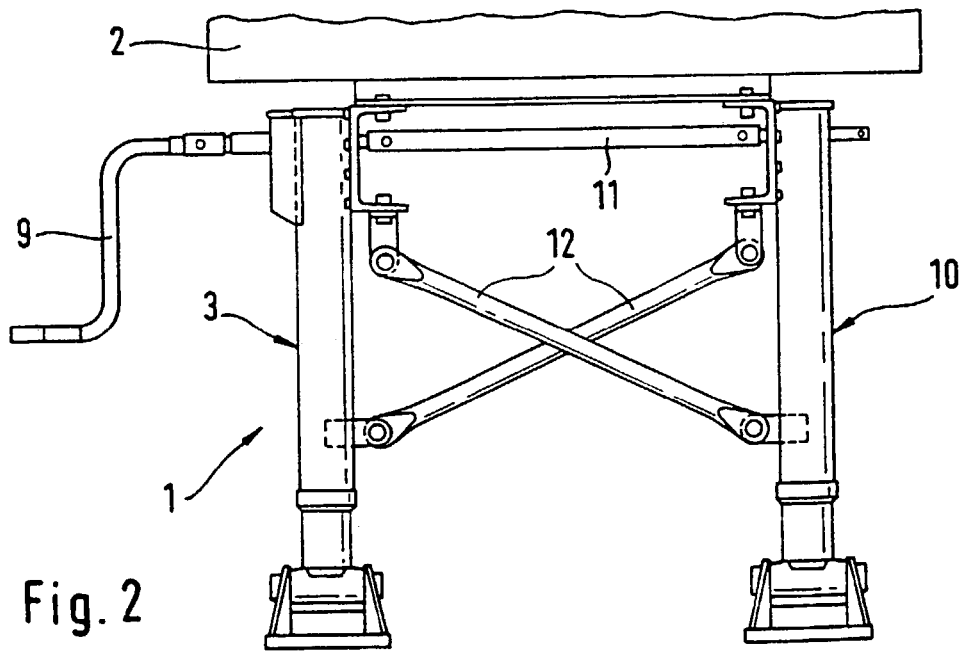

FIG. 2 shows the trailer 2 and the device 1 according to the invention in FIG. 1 in a view from the front. In this case one recognizes that the apparatus 1 according to the invention has a second supporting element 10 which is coupled to supporting element 3 via a shaft 11. Through this coupling the two supporting elements 3, 10c can be adjusted in height at the same time. Between the supporting elements 3, 10 cross struts 12 are arranged also for increasing the tipping safety 2.

Figure 3:
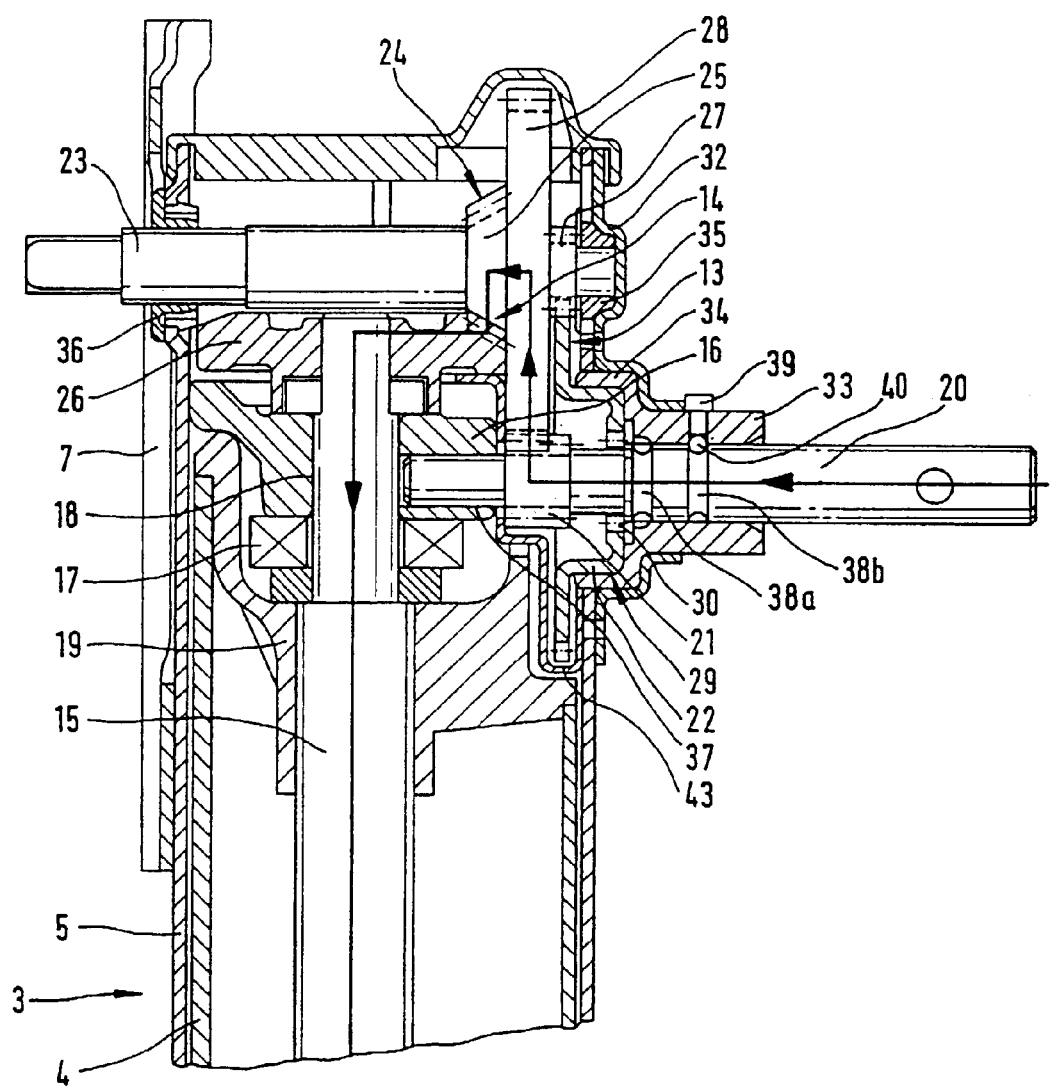

FIG. 3 shows the upper region of the supporting element 3 in FIG. 1 in a strongly enlarged longitudinal section. The supporting element 3 has a spindle 15 driven by a gear shifting mechanism 13 and a bevel gear wheel arrangement 14. On the outer sleeve 5a bearing block 16 of the spindle 15 is affixed with an axial bearing 17 and a radial bearing 18. On the inner sleeve 4a spindle nut 19 engaging the spindle 15 is supported. By rotating the spindle 15 the sleeves 4, 5 can be moved apart and therefore the height of the supporting element 3 adjusted.

The gear shifting mechanism 13 has a gear input shaft 20 with a pinion 21 affixed to it and with a large-diameter sprocket wheel 22 and a gear output shaft 23 with a set of sprocket wheels 24. The sprocket wheel set 24 and the spindle 15 in each case are nonrotatably connected to a bevel gearwheel 25, 26 of the bevel gearwheel arrangement 14. The gear input shaft 20 and the gear output shaft 23 in each case lead out of the supporting element 3. The hand crank 9 or an electric motor shown in FIG. 1 may be connected to the gear input shaft 20. The shaft 11 shown in FIG. 2 may be connected to the gear output shaft 23 for coupling to the second supporting element 10. The pinion 21 is formed as a single part with the gear input shaft 20. The large-diameter sprocket wheel 22 displays a cup-shaped region 29 and an inner denticulation 30 corresponding to the pinion 21. Additional free space is created by the cup-shaped sprocket wheel 22 so that a compact arrangement becomes possible. The sprocket wheel set 24 has a small-diameter sprocket wheel 27, made as one piece with the gear output shaft 23, and a large-diameter sprocket wheel 28. The small-diameter sprocket wheel 27 is constantly engaged with the large-diameter sprocket wheel 22 of the gear input shaft 20. The large-diameter sprocket wheel 28 has an internal denticulation 28a with which it is fitted over denticulation 25a of the bevel gearwheel 25 (see FIG. 9c). In this way sprocket wheels 25, 27, 28 of the sprocket wheel set 24 are held nonrotatably on the gear output shaft 23.

The gear input shaft (20) can be moved coaxially so that the pinion 21 may optionally be engaged with the large-diameter sprocket wheel 28 of the gear output shaft 23 or with the internal denticulation 30 of the large-diameter sprocket wheel 22 of the gear input shaft 20. Furthermore the pinion 21 can be moved into the cup-shaped region 29 of the large-diameter sprocket wheel 22. In this way the gear shift 13 has a free-floating [neutral] gear. In the position shown in the drawing the pinion 21 engages a large-diameter sprocket wheel 28 of the sprocket wheel set 24 of the gear output shaft 23. This shift position is characterized by a short translation of the gear shifting mechanism 13. In this case the supporting element 3, e.g., can be placed under a load. For illustration in the drawing the flow of forces from the gear input shaft 20 to the spindle 15 is indicated by arrows. In all shift positions the large-diameter sprocket wheel 22 is constantly engaged with a small-diameter sprocket wheel 27 of the gear output shaft 23.

The gear shifting mechanism 13 is installed almost completely inside the outer sleeve 5. In this region the outer sleeve 5 has a covering 32 with bearings 33, 34, 35 for the gear output shaft 23, the gear input shaft 20 and for the cup-shaped region 29 of the large-diameter sprocket wheel 22 of the gear input shaft 20. Another bearing 36 for the gear output shaft 23 is located in a wall of the outer sleeve 5 lying opposite the covering 32. A radial bearing support 37 for the gear input shaft 20 is arranged in the bearing block 16 of spindle 15. The gear input shaft 20 has two grooves 38a, b. A locking element 40 arranged in a cartridge 39 of the covering 32 is clamped in radially toward the gear input shaft to selectively engage grooves 38a,b. In the shift position shown here the locking element 40 engages the groove 38b. In this way the gear input shaft 20 is held in the position shown in the drawing. Below the large-diameter sprocket wheel 22 of the gear input shaft 20 and the pinion 21a collecting trough 43 for lubricant is positioned.

Figure 4:
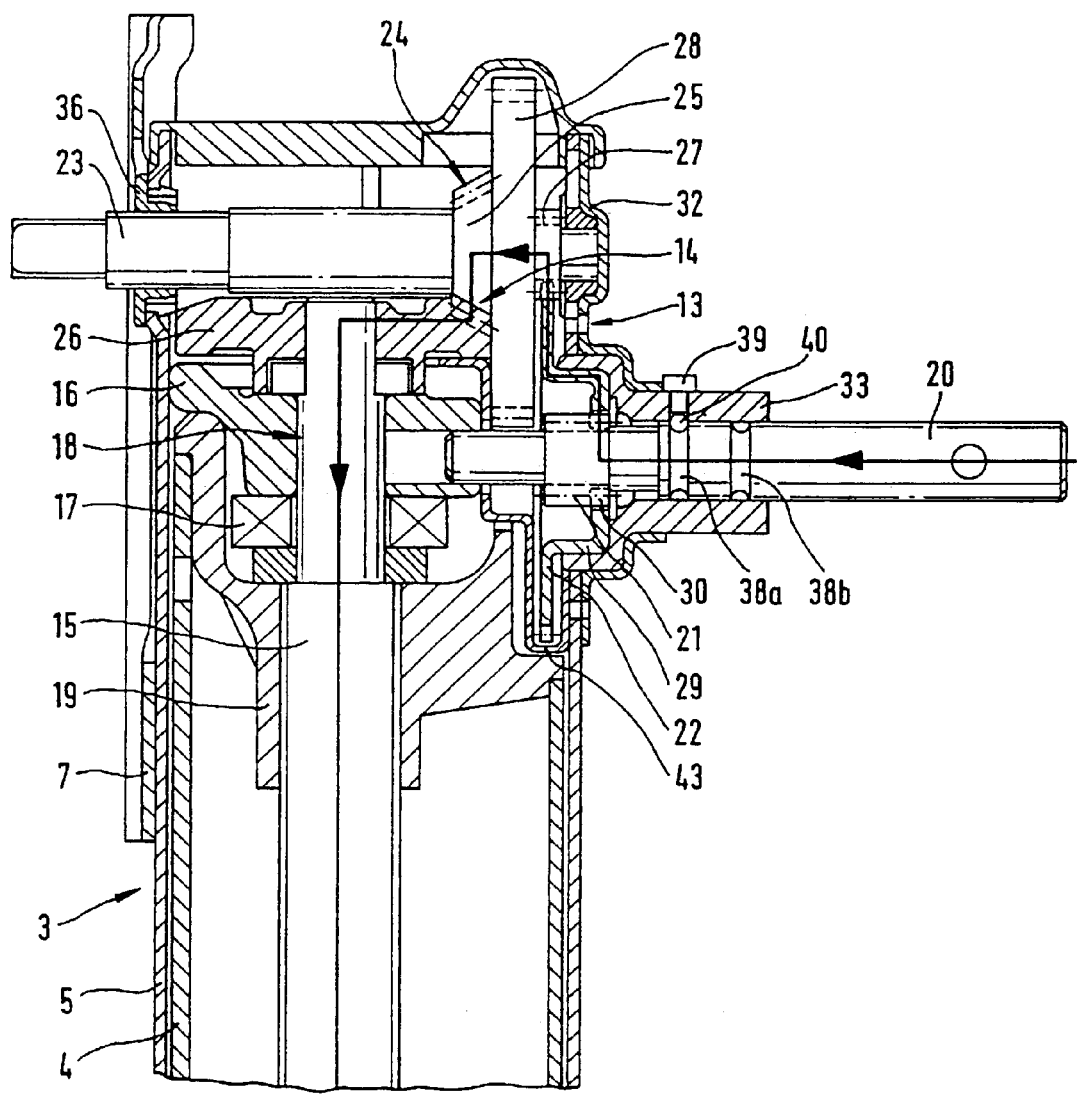

FIG. 4 shows the supporting element 3 from FIG. 4 in which the gear shifting mechanism 13 has been shifted for a long translation. In this case compared to the shift position shown in FIG. 3 the gear input shaft 20 is pulled so far out of the supporting element 3 that the pinion 21 engages the inner denticulation 30 of the large-diameter sprocket wheel 22. In this shift position the supporting element 3 can be adjusted very quickly without load. Furthermore FIG. 4 shows that the locking element 40 engages the groove 38a of the gear input shaft 20.

Figure 5:
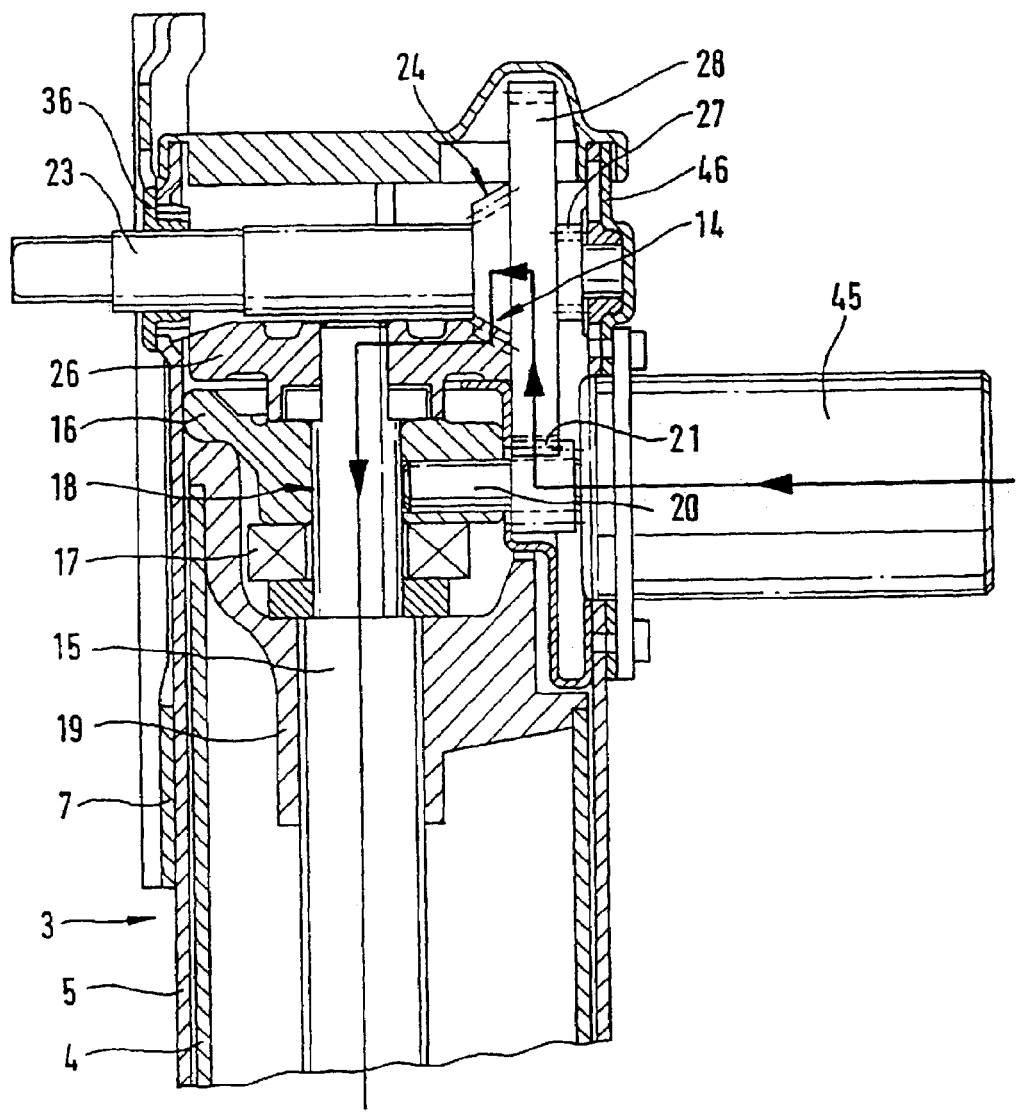

In FIG. 5 another variant is shown with an electric motor 45 whose output shaft is identical with the gear input shaft 20. The electric motor 5 is a high speed motor which is intended for load operation.

In FIGS. 6a-c the spindle nut 19 is shown in perspective view and cross section. To receive the bearing block 16 and the axial mounting 17 as well as to form a lubricant reservoir for the spindle 15a cup-shaped internal space 62 is provided which is bounded on 3 sides by the collar segments 60a, b, c, which are connected to the inner sleeve 4. In the collar segments 60a and c openings 65a and b are provided for interlocking with the inner pipe 4. As opposed to conventional spindle nuts the 4th collar segment 60d is pulled downward in order to create room for the sprocket wheel 22 as may be seen in FIG. 3. The inner sleeve 4 is adapted to the configuration of the collar segments 60a-d, the large overlap with the outer sleeve 5 remaining preserved in the extended state. In this way a compact arrangement is achieved.

In order to close off the cup-shaped inner space 62 an additional intermediate wall 61 is provided above the collar segment 60d which, because of the mounting of the gear input shaft 20 in the bearing block 16, does not extend so far up as the collar segments 60a through c.

As may be perceived from FIG. 6b the collar segment 60d essentially forms a horizontal projection of the nut body 63 in which the inner threading 64 of the spindle 15 is situated.

Figure 7A:
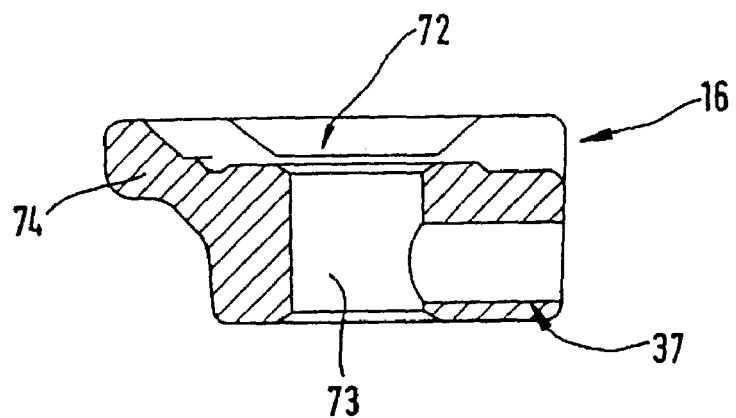
Figure 7B:
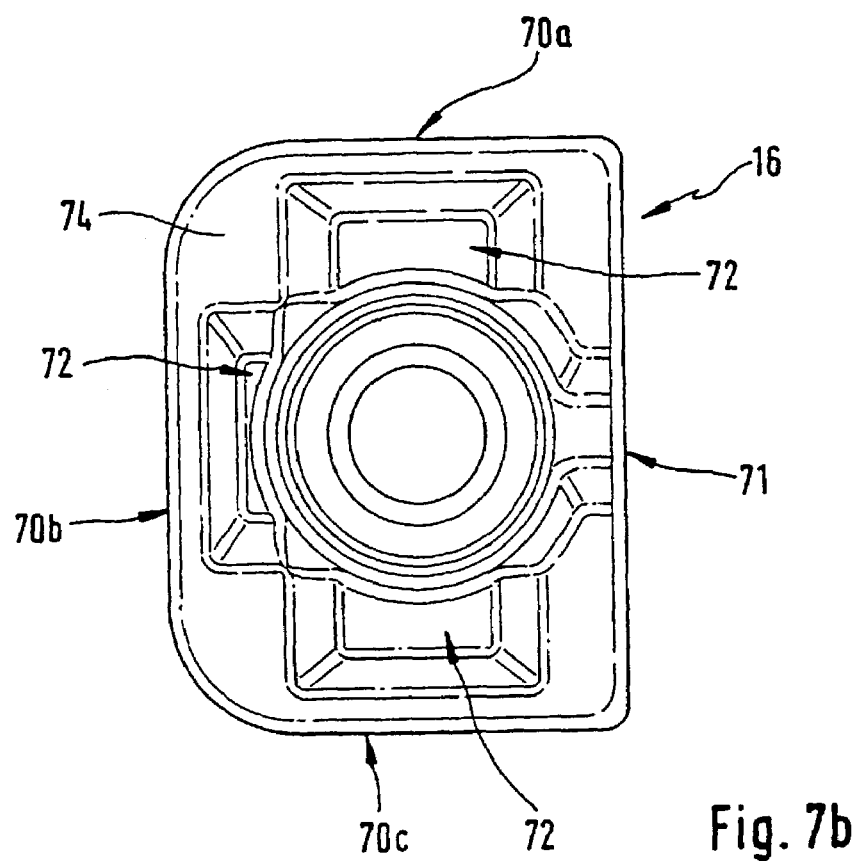
Figure 8:
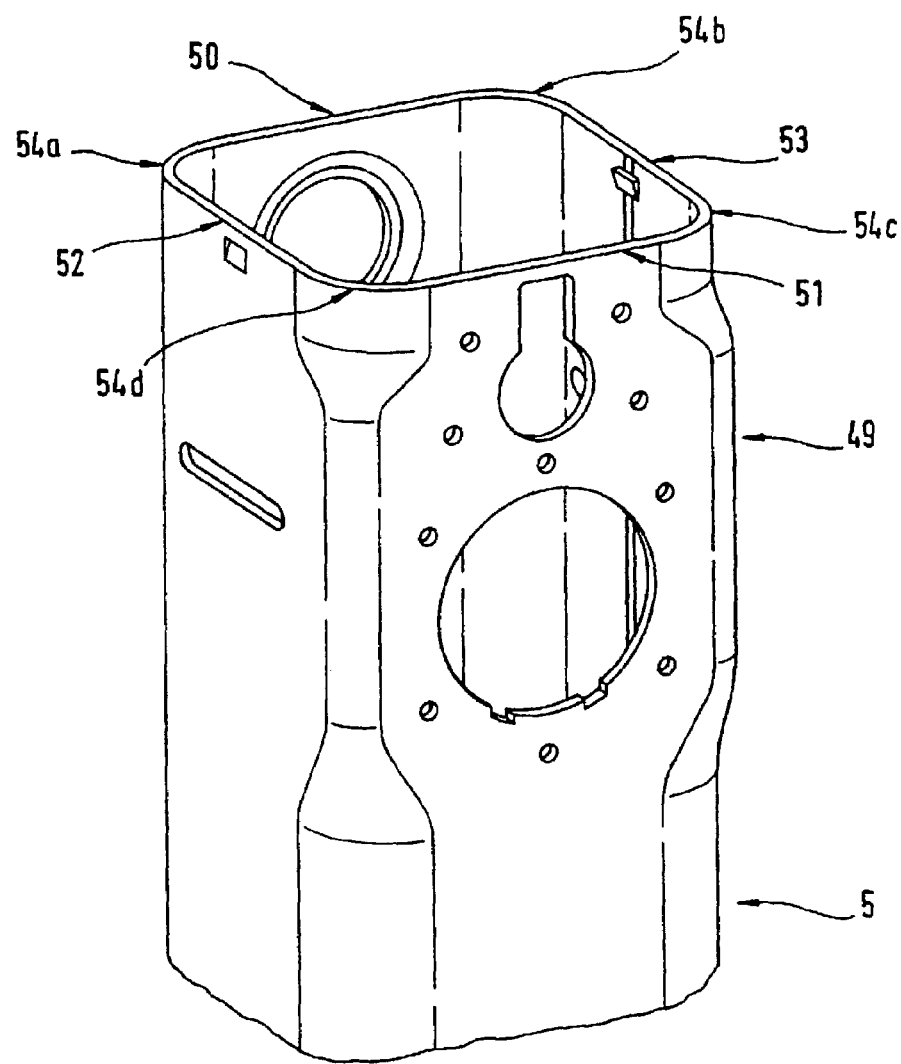

In FIGS. 7a and b the bearing block 16 is shown in cross section and top view. The boring for the bearing mount 37 of the threaded input shaft 20 extends as far as the boring 73 for the spindle 15. In this way the space available for mounting the gear input shaft 20 is fully utilized. The bearing block 16 has a cross-shaped depression 72 on the top side which serves both for weight reduction and also for engaging the bevel gear wheel 26. The edge fins 74 serve to stiffen and for transmission of force to the outer sleeve 5 where only the three sides 70a-c are welded into the outer sleeve 5. The side 71 is not welded in and is positioned close to the sprocket wheel 28. This configuration of the bearing blocks 16 also contributes to compact construction. In FIG. 8 the outer sleeve 5 is shown in perspective view, which is designed as a rectangular pipe with side walls 50-53 and the round segments 54a-d. For optical reasons and for reasons of weight reduction large radii were chosen for these round segments 54a-d. In the upper region of the outer sleeve of 5 these large radii, however, have the disadvantage that sufficient space is not available for the arrangement of the sprocket wheel and especially for sprocket wheel 28 which should have the largest possible diameter. In order to enlarge the interior space in the region of the sprocket wheel arrangement and therefore to fully utilize it, embossings 49 are pressed in the round segments 54*c* and *d* which therefore display a smaller radius.

Figure 9A:
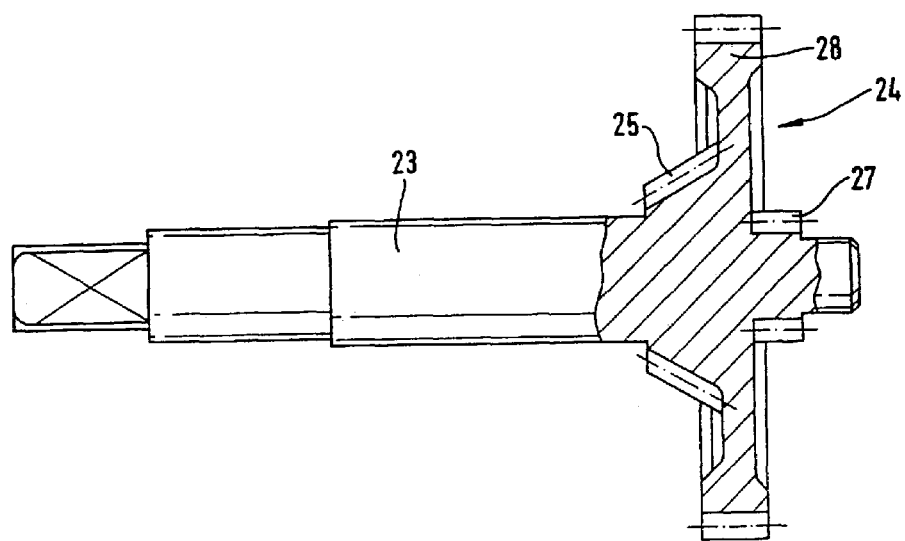
Figure 9C:
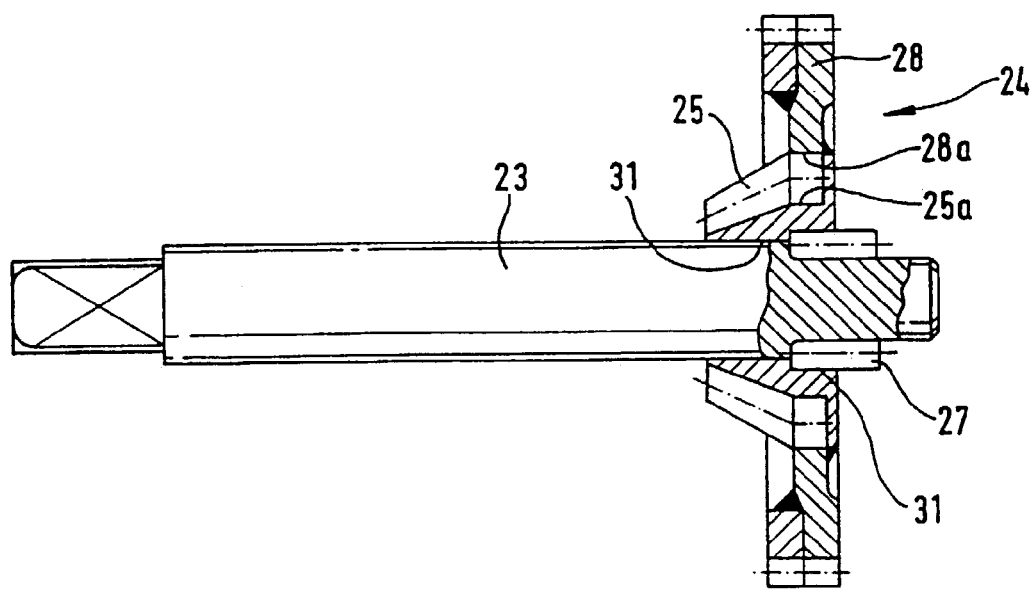

FIG. 9*a* through *c* show different variants of gear output shaft 23, bevel gear wheel 25 and sprocket wheels 27, 28. In FIG. 9*a* all components are formed as one piece with the set of sprocket wheels 24. In FIG. 9*b* the bevel gear wheel 25 and the sprocket wheel 28 are formed as one piece, said component having an internal denticulation 31 by which the gear output shaft 23, formed as one piece with sprocket wheel 27, can be affixed.

In FIG. 9*c* the components 23, 25, and 28 are independent components which are joined together by denticulations 28*a*, 25*a* and 31. In this variant also the gear output shaft 23 is formed as one piece with sprocket wheel 27.

LIST OF REFERENCE NUMBERS

1. Apparatus
2. Trailer
3. Supporting Element
4. Inner Sleeve
5. Outer sleeve
6. Foot
7. Plate
8. Cross Strut
9. Hand Crank
10. Supporting Element
11. Shaft
12. Cross Strut
13. Gear Shift
14. Bevel Gear Arrangement
15. Spindle
16. Bearing Block
17. Axial Bearing
18. Radial Bearing
19. Spindle Nut
20. Gear Input Shaft
21. Pinion
22. Sprocket Wheel
23. Gear Output Shaft
24. Set of Sprocket Wheels
25. Bevel Gear Wheel
25*a*. Denticulation
26. Bevel Gear Wheel
27. Sprocket Wheel
28. Sprocket Wheel
28*a*. Internal Denticulation
29. Cup-Shaped Region
30. Internal Denticulation
31. Internal Denticulation
32. Covering
33. Bearing
34. Bearing
35. Bearing
36. Bearing
37. Bearing Mount
38*a, b*. Groove
39. Cartridge
40. Blocking Element
43. Collecting Trough.
45. Electric Motor
49. Embossing
50-53. Side Walls
54*a-d*. Round Segment
60*a-c, d*. Collar Segment
61. Intermediate Wall
62. Cup-Shaped internal space
63. Nut Body
64. Internal Thread
65*a, b*. Opening
70*a-c*. Welded-in Side
71. Free Side
72. Cross Shaped Depression
73. Through Boring
74. Edge Fin

The invention claimed is:

1. In an apparatus for supporting a trailer of a tractor-semitrailer with a telescopically height-adjustable supporting element having an outer sleeve and an inner sleeve, with a spindle mounted in the supporting element and driven by a multi step gear shifting mechanism via a bevel gear arrangement and with a spindle nut engaging one of the sleeves and collaborating with the spindle, said gear shifting mechanism displaying a gear input shaft having both a small-diameter sprocket wheel and a large-diameter sprocket wheel, a rotatably mounted set of sprocket wheels collaborating with the sprocket wheels of the gear input shaft and bevel gear arrangement as well as shiftable coupling means designed for the optional connection of the gear input shaft to the sprocket wheels of the sprocket wheel set via one of the sprocket wheels, wherein the improvement comprises an arrangement of the gear input shaft running perpendicularly and in one a common plane onto with the spindle.

2. The apparatus as in claim 1, wherein the spindle and the gear input shaft have a common bearing block.

3. The apparatus as in claim 2 wherein the spindle nut displays a cup-shaped inner space which is open at the top; and wherein a portion of the bearing block is disposed in the inner space when the spindle nut is adjacent the bearing block.

4. The apparatus as in claim 3, wherein the inner space of the spindle nut is bounded by three laterally outwardly projecting collar segments located at the same height and wherein the spindle nut displays a lower-lying laterally outwardly projecting collar segment disposed directly below the large-diameter sprocket wheel; and wherein the lower-lying collar segment is disposed adjacent the large-diameter sprocket wheel when the spindle nut is adjacent the bearing block.

5. The apparatus as in claim 4, wherein the spindle nut displays an upwardly extending intermediate wall above the lower-lying collar segment; and wherein when the spindle nut is adjacent the bearing block the large-diameter sprocket wheel is disposed laterally adjacent the intermediate wall and the input shaft extends over the intermediate wall into the inner space.

6. The apparatus as in claim 2, wherein the bevel gear arrangement includes a first bevel gear mounted on and rotatable with the spindle; and wherein the bearing block displays a depression on its top side in which a portion of the first bevel gear is disposed.

7. The apparatus as in claim 2, wherein the bearing block defines a bearing boring for the gear input shaft and a through-going boring in which the spindle is received; and wherein the bearing boring communicates with the through-going boring.

8. The apparatus as claim 2, wherein the bearing block is connected to the outer sleeve on three sides, the fourth side being arranged inwardly some distance away from the outer sleeve; and wherein a portion of one of the sprocket wheels is disposed between the fourth side and the outer sleeve.

9. The apparatus as in claim 2 wherein the gear input shaft has at least one groove to receive radially-inward pre-tensioned locking elements arranged in cartridges of the bearing block.

10. The apparatus as in claim 1, wherein the sprocket wheel set is manufactured as one piece a gear output shaft.

11. The apparatus as in claim 10, wherein the gear input shaft and the gear output shaft are mounted in a covering which closes an opening of the outer sleeve.

12. The apparatus as in claim 11, wherein the covering is designed as single piece.

13. The apparatus of claim 11 wherein the gear input shaft has at least one groove to receive radially-inward pre-tensioned locking elements arranged in cartridges of the covering.

14. The apparatus as in claim 11, wherein the covering is manufactured from a sintered material.

15. The apparatus of claim 1 further including a small-diameter sprocket wheel of the sprocket wheel set, the small diameter sprocket wheel being designed as an interlocking connection of the gear output shaft with an inner denticulation of one of the remaining sprocket wheels.

16. The apparatus as in claim 1, wherein the large-diameter sprocket wheel of the sprocket wheel set has an inner denticulation and is seated on a correspondingly designed denticulation of one of the sprocket wheels.

17. The apparatus of claim 16 wherein the small-diameter sprocket wheel of the gear input shaft is designed as a means for coupling the gear input shaft with the large-diameter sprocket wheel displaying the inner denticulation.

18. The apparatus of claim 16 wherein the large-daimeter sprocket wheel of the gear input shaft has a cup-shaped region for receivably holding the small-diameter sprocket wheel in a central position.

19. The apparatus as in claim 1, wherein the spindle is arranged outside of the center of the supporting element.

20. The apparatus of claim 1 wherein the improvement further comprises a collecting pan for lubricant positioned below the large-diameter sprocket wheel.

21. A leg for a semitrailer landing gear, the leg comprising:
an outer sleeve and an inner sleeve, the inner sleeve being telescopically received in the outer sleeve;
an input shaft which is rotatable about a longitudinal axis;
a rotatable spindle disposed within the inner and outer sleeves;
a gear assembly connected to the input shaft; the gear assembly capable of rotating the spindle to raise and lower the inner sleeve with respect to the outer sleeve in response to rotation of the input shaft;
a bearing block connected to the outer sleeve;
the bearing block having a bearing bore;
a portion of the input shaft being received in the bearing bore; and
a spindle nut having a top and operatively connecting the gear assembly to the inner sleeve for the raising and lowering of the inner sleeve via collaboration of the spindle and spindle nut; the top of the nut being disposed above the longitudinal axis of the input shaft when the nut engages or is adjacent the bearing block.

22. A leg for a semitrailer landing gear, the leg comprising:
an outer sleeve and an inner sleeve; the inner sleeve being telescopically received in the outer sleeve;
an input shaft having a longitudinal axis;
an output shaft which is offset from the input shaft and rotatable about an output shaft axis;
a gear assembly connected to the input shaft; the gear assembly capable of raising and lowering the inner sleeve with respect to the outer sleeve in response to rotation of the input shaft;
the gear assembly having a spindle that has a longitudinal axis;
the spindle threadedly engaging a spindle nut that moves the inner sleeve up and down in response to rotation of the spindle;
the input shaft and spindle being disposed in a common reference plane;
a bearing block connected to the outer sleeve; the input shaft being supported by the bearing block.

23. The leg of claim 22, further comprising a cover connected to the outer sleeve; the leg being free of gears disposed between the cover and the outer sleeve.

24. A leg for a semitrailer landing gear, the leg comprising:
an outer sleeve;
an inner sleeve telescopically received in the outer sleeve;
a rotatable spindle which is disposed within the inner and outer sleeves;
an input shaft which is rotatable about an input shaft axis and has an inner end which is disposed within the outer sleeve;
an output shaft which is offset from the input shaft and rotatable about an output shaft axis; and
a gear assembly for rotating the spindle to raise and lower the inner sleeve with respect to the outer sleeve in response to rotation of the input shaft.

25. The leg of claim 24 wherein the gear assembly includes a plurality of sprocket wheels including a first sprocket wheel; further including a spindle nut which is non-rotatably mounted on the inner sleeve and which collaborates with the spindle for raising and lowering the inner sleeve and spindle nut with respect to the outer sleeve between raised and lowered positions in response to rotation of the spindle; and wherein the spindle nut defines an upwardly opening recess in which a portion of the first sprocket wheel is received when the spindle nut is in the raised position.

26. The leg of claim 24 wherein the gear assembly includes a first sprocket wheel having an outer perimeter; and further including a lubricant collecting pan which is disposed below the first sprocket wheel and through which the outer perimeter of the sprocket wheel passes during rotation of the first sprocket wheel.

27. The leg of claim 24 wherein the gear assembly includes a first sprocket wheel; and further including a bearing block defining a bearing bore in which the input shaft is received; wherein the bearing block is disposed within and connected to the outer sleeve; and wherein the bearing block has a first side which faces laterally outwardly and is spaced inwardly from the outer sleeve so that the first side and the outer sleeve define therebetween a space in which a portion of the first sprocket wheel is disposed.

28. The leg of claim 24 wherein the outer sleeve has a sidewall defining an opening; wherein the gear assembly includes a first bevel gear, a second bevel gear operatively engaging the first bevel gear, and a first sprocket wheel a portion of which is disposed in the opening in the outer sleeve sidewall; and wherein the first sprocket wheel has an outer denticulation which is disposed entirely within the outer sleeve sidewall.

29. The leg of claim 24 wherein the gear assembly includes a first bevel gear which is mounted on the spindle and rotatable therewith; a second bevel gear which operatively engages the first bevel gear; and a plurality of sprocket wheels; and wherein at least one of the sprocket wheels is disposed entirely within the outer sleeve.

30. The leg of claim 24 wherein the outer sleeve has a sidewall defining an input shaft entrance opening; wherein the spindle has an upper end; wherein the input shaft is disposed below the upper end of the spindle and extends through the input shaft entrance opening so that the inner end of the spindle faces the spindle; further including a spindle nut which is non-rotatably mounted on the inner sleeve and which collaborates with the spindle for raising and lowering the inner sleeve and spindle nut with respect to the outer sleeve in response to rotation of the spindle; and wherein the spindle is positioned off center within the inner and outer sleeves in a direction away from the input shaft entrance opening so that the off center spindle and the outer sleeve sidewall adjacent the input shaft entrance opening define therebetween a laterally extending enlarged space for accommodating therein a portion of the input shaft adjacent the inner end thereof.

31. The leg of claim 30 wherein the gear assembly includes a first bevel gear; a second bevel gear operatively engaging the first bevel gear; and a first sprocket wheel a portion of which is disposed within the enlarged space.

32. The leg of claim 24 further including a bearing block defining a bearing bore for receiving a portion of the input shaft therein; and a spindle nut non-rotatably mounted on the inner sleeve and collaborating with the spindle for raising and lowering the inner sleeve with respect to the outer sleeve in response to rotation of the spindle;

wherein the gear assembly includes a sprocket wheel rotatable about the input shaft axis;

wherein the spindle nut includes an upwardly extending sidewall which defines an upwardly opening recess which receives therein a portion of the bearing block when the spindle nut is disposed adjacent the bearing block;

wherein the spindle nut includes a collar which projects laterally outwardly from the sidewall; wherein the collar includes a first collar segment which is disposed at a first height and a second collar segment which is disposed at a second height lower than the first height; wherein the first and second collar segments are connected to the inner sleeve;

wherein a portion of the sprocket wheel is disposed directly above the second collar segment of the spindle nut; and wherein the portion of the sprocket wheel is disposed laterally adjacent the sidewall of the spindle nut when the upwardly opening recess of the spindle nut receives therein the portion of the bearing block.

\* \* \* \* \*